US012218999B2

(12) United States Patent
White, Jr. et al.

(10) Patent No.: US 12,218,999 B2
(45) Date of Patent: Feb. 4, 2025

(54) SELECTIVE CONTENT SHARING IN A VIDEO CONFERENCE

(71) Applicant: Cisco Technology, Inc., San Jose, CA (US)

(72) Inventors: David C. White, Jr., St. Petersburg, FL (US); Magnus Mortensen, Cary, NC (US); Jay Kemper Johnston, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 541 days.

(21) Appl. No.: 17/324,748

(22) Filed: May 19, 2021

(65) Prior Publication Data

US 2022/0377120 A1 Nov. 24, 2022

(51) Int. Cl.

| | |
|---|---|
| ***H04L 65/613*** | (2022.01) |
| ***H04L 65/401*** | (2022.01) |
| ***H04L 65/403*** | (2022.01) |
| ***H04L 65/612*** | (2022.01) |
| ***H04L 65/75*** | (2022.01) |

(52) U.S. Cl.

CPC ........ *H04L 65/613* (2022.05); *H04L 65/4015* (2013.01); *H04L 65/403* (2013.01); *H04L 65/612* (2022.05); *H04L 65/764* (2022.05)

(58) Field of Classification Search

CPC ............... H04L 65/403; H04L 65/1069; H04L 12/1818; H04L 12/1813; H04L 67/1095; H04L 65/60; H04L 65/75; H04L 67/104

See application file for complete search history.

(56) References Cited

U.S. PATENT DOCUMENTS

| | | | | |
|---|---|---|---|---|
| 9,866,793 | B1 * | 1/2018 | Moeeni | H04L 65/4046 |
| 2006/0002315 | A1 | 1/2006 | Theurer et al. | |
| 2008/0294992 | A1 | 11/2008 | Liang et al. | |
| 2011/0279628 | A1 * | 11/2011 | Khot | H04N 7/152 348/14.08 |
| 2013/0223617 | A1 * | 8/2013 | Steiner | G06Q 10/06311 379/265.13 |
| 2015/0378995 | A1 * | 12/2015 | Brown | H04L 65/403 707/608 |
| 2016/0011845 | A1 | 1/2016 | Kuchoor | |

(Continued)

OTHER PUBLICATIONS

Cisco Webex, "Share Your Screen or Application in a Meeting", https://help.webex.com/en-us/162jfl/Webex-Share-Your-Screen-or-Application-in-a-Meeting, Feb. 25, 2021, 9 pages.

(Continued)

*Primary Examiner* — Hitesh Patel

(74) *Attorney, Agent, or Firm* — Edell, Shapiro & Finnan, LLC

(57) ABSTRACT

Techniques are described to enable selective content sharing in a video conference. In one example, a conferencing system obtains first display content from a first endpoint device in a video conference session. The conferencing system streams the first display content to a second endpoint device in the video conference session and obtains second display content from the second endpoint device. While streaming the first display content to the second endpoint device, the conferencing system streams the second display content to a third endpoint device in the video conference session and prevents streaming of the second display content to the first endpoint device.

20 Claims, 13 Drawing Sheets

(56) References Cited

U.S. PATENT DOCUMENTS

| | | | | |
|---|---|---|---|---|
| 2016/0234276 | A1 | 8/2016 | Ouyang et al. | |
| 2017/0302708 | A1 | 10/2017 | Thomas et al. | |
| 2021/0044645 | A1 * | 2/2021 | Jayaweera .............. | H04L 65/75 |

OTHER PUBLICATIONS

Oblong, "Transform Your Video Conferencing Experience With Multi-Share Collaboration", Mezzanine + Webex brochure, downloaded from the Internet May 4, 2021, 11 pages.

Oblong Industries, "Mezzanine + Webex Room Systems", https://www.oblong.com/cisco, downloaded from the Internet May 4, 2021, 7 pages.

Zoom, "Sharing Multiple Screens Simultaneously", https://support.zoom.us/hc/en-us/articles/115000424286-Sharing-multiple-screens-simultaneously, downloaded from the Internet May 4, 2021, 2 pages.

Jibb, "Instantly Share Your Handwriting With Others Online", https://www.jibb.ai/, downloaded from the Internet May 4, 2021, 11 pages.

Jibb, "Frequently Asked Questions", https://www.jibb.ai/faqs/, downloaded from the Internet May 4, 2021, 5 pages.

Jibb, "Whiteboard Session Tips", https://www.jibb.ai/whiteboard-tips/, downloaded from the Internet May 4, 2021, 17 pages.

Jibb, "Paper Session Tips", https://www.jibb.ai/paper-tips/, downloaded from the Internet May 4, 2021, 23 pages.

Jibb, "The Problem to Solve", https://www.jibb.ai/education/, downloaded from the Internet May 4, 2021, 11 pages.

Blackboard, "Share Content", https://help.blackboard.com/Collaborate/Ultra/Moderator/Moderate_Sessions/Share_Content, Feb. 2, 2021, 11 pages.

Seesaw, "Demonstrate and Share Learning", https://web.seesaw.me/, downloaded from the Internet May 4, 2021, 7 bages.

Seesaw, "Multimodal Learning Tools That Put Student Voice and Choice First", https://web.seesaw.me/creative-tools, downloaded from the Internet May 4, 2021, 5 pages.

Seesaw, "Teacher-Parent Communication Centered on Learning", https://web.seesaw.me/family-communication, downloaded from the Internet May 4, 2021, 9 pages.

* cited by examiner

SELECTIVE CONTENT SHARING IN A VIDEO CONFERENCE

TECHNICAL FIELD

The present disclosure relates to video conferencing.

BACKGROUND

A video conference allows two or more remote users to communicate with each other. During a video conference session, users can exchange audio and video with each other via respective user endpoint devices. Existing video conference technology allows a user to share their display with all the other users. Display sharing can improve collaboration during a video conference session.

DESCRIPTION OF EXAMPLE EMBODIMENTS

Overview

Figure 1:
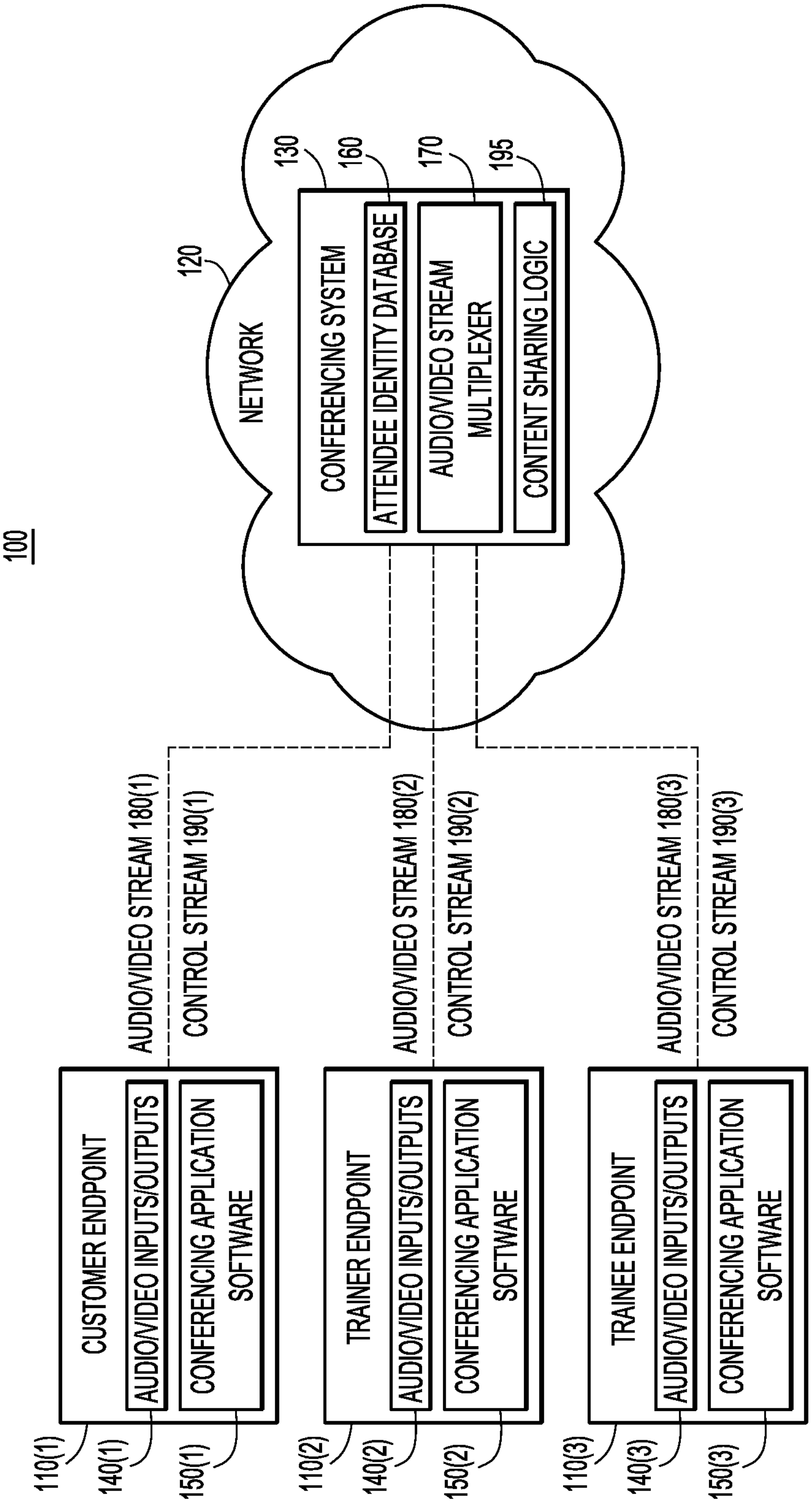
FIG. 1 illustrates a system for selective content sharing in a video conference, according to an example embodiment.

Techniques are described to enable selective content sharing in a video conference. In one example embodiment, a conferencing system obtains first display content from a first endpoint device in a video conference session. The conferencing system streams the first display content to a second endpoint device in the video conference session and obtains second display content from the second endpoint device. While streaming the first display content to the second endpoint device, the conferencing system streams the second display content to a third endpoint device in the video conference session and prevents streaming of the second display content to the first endpoint device.

EXAMPLE EMBODIMENTS

In existing video conference sessions, a user can assume a "presenter" role and share their display content with every other user participating in the video conference session. However, there are many use cases in which a user might wish to share content with select users while another user is presenting. Today, users cannot selectively share content while another user is presenting.

One example use case relates to remotely onboarding and training new employees, particularly new employees who are hired as support personnel to resolve customer support issues. Typically, the new employees ("apprentices" or "trainees") would be trained by working in the same physical space as an experienced employee ("expert" or "lead" or "trainer"). By shadowing the trainer, the trainee would gain valuable experience and eventually learn how to handle customer support issues autonomously.

In one example, the trainer would join a video conference session with a customer. During the video conference session, the customer might share content with the trainer to help the trainer resolve the customer support issue. While the trainer works with the customer to resolve the issue, the trainee would sit near the trainer. The trainee would watch as the trainer analyzes the issue and researches the solution. The trainee would also observe the trainer using internal resources and tools to resolve the issue. The trainee's presence would remain unknown to the customer to maintain customer confidence that the issue would be expertly resolved. At certain points, the trainer would place the customer on mute and explain important observations to the trainee.

The typical training process described above is not possible when the trainee is remote from the trainer. For example, the trainer cannot simply point to the screen or mute the customer to speak to the trainee. Instead, the trainee would join the video conference session as an anonymous observer, which would create its own host of problems. One problem is that the customer would know that someone else was present because the customer would see that someone joined the video conference session as an observer. The trainer would also need to explain to the customer who the trainee is and why the trainee joined the video conference session, which could erode customer confidence.

Another problem with the trainee joining the video conference session anonymously is that the trainee could see only the content shared by the customer, and not the trainer's activity to resolve the issue. For example, the trainee would be unable to observe the research and internal tools the trainer is using to identify and resolve the problem. The trainer also would not be able to speak privately to the trainee. As a result, the customer would be able to hear the trainer teaching the trainee, which would worsen the customer experience. A private text chat between the trainee and the trainer is not an adequate solution because the chat would generally require frantic typing, chatting, and copy-pasting of links, particularly in high-complexity cases where simply following a script would not resolve the customer issue.

Accordingly, techniques are presented herein to enable a first user to share content with a second user while the second user is selectively sharing content with the third user but not the first user. For example, a trainee may receive multiple video/sharing feeds: one feed from the end customer, and another feed from the trainer. The feed from the trainer may enable the trainee to monitor the internal resources leveraged by the trainer to solve the customer issue. Thus, one or more remote trainees may view and/or hear not only content from the customer, but also content from the trainer who is actively working on the issue.

As a result, these techniques may enable the trainer to educate the trainee in an efficient manner during a support session without the customer knowing. Specifically, the trainee—but not the customer—may hear and see how a trainer is resolving a customer issue. That is, unbeknownst to the customer, the trainee may observe the customer content while simultaneously monitoring the internal research/troubleshooting performed by the trainer. The customer, trainer, and/or trainee may have unique views depending on how content is selectively shared.

The techniques described herein are discussed with respect to the specific example of trainees; however, it will be appreciated that these techniques may apply to any suitable use case. For example, consider a scenario in which an intern is sharing a public document with company executives during a video conference session. The techniques described herein may enable one executive to share a confidential or proprietary document with the other executive—but not with the intern—while the intern continues to share the public document. Other use cases may be envisioned. The techniques described herein may improve numerous aspects of video conferencing technology, including improved user interface/experience (e.g., as illustrated in the trainee/trainer example) and stronger security (e.g., as illustrated in the intern/executive example). As further illustrated in the trainee/trainer example, these techniques may also help expeditiously resolve technical support problems, such as computer equipment or networking issues.

FIG. 1 illustrates an example system 100 for selective content sharing in a video conference. System 100 includes customer endpoint 110(1), trainer endpoint 110(2), and trainee endpoint 110(3). System 100 further includes network 120, which in turn includes conferencing system 130. Endpoints 110(1)-110(3) include audio/video inputs/outputs 140(1)-140(3) and conferencing application software 150(1)-150(3). Conferencing system 130 includes attendee identity database 160 and audio/video stream multiplexer 170. The conferencing system 130 may be implemented by one or a plurality of servers.

Endpoints 110(1)-110(3) may include smartphones, laptops, desktop computers, tablets and/or any other suitable devices to enable respective users to participate in a video conference session. Audio/video inputs/outputs 140(1)-140(3) may include microphones, cameras, speakers, display screens (e.g., monitors), etc. Audio/video inputs/outputs 140(1)-140(3) may be external devices that interface with endpoints 110(1)-110(3). Alternatively, audio/video inputs/outputs 140(1)-140(3) may be integrated with endpoints 110(1)-110(3). Conferencing application software 150(1)-150(3) may include software that enables endpoints 110(1)-110(3) to participant in a video conference session hosted by conferencing system 130.

Network 120 may include any suitable network, such as a Wide Area Network (WAN) (e.g., the Internet). Conferencing system 130 may include one or more servers configured to facilitate (e.g., host) a video conference session. Attendee identity database 160 may include identities of one or more users (e.g., the customer, the trainer, the trainee, etc.). Audio/video stream multiplexer 170 may be configured to combine multiple input streams into a single output stream.

In one example, endpoints 110(1)-110(3) join a video conference session (e.g., a remote support session) hosted by conferencing system 130. Endpoints 110(1)-130(3) may use conferencing application software 150(1)-150(3) to join the video conference session. Before, during, or after endpoints 110(1)-110(3) join the video conference session, conferencing system 130 may use attendee identity database 160 to identify the customer, trainer, and trainee.

Once the video conference session has begun, endpoints 110(1)-130(3) may exchange audio/video streams 180(1)-180(3) with conferencing system 130. Audio/video streams 180(1)-180(3) may include bi-directional video and audio streams. For example, a camera associated with customer endpoint 110(1) may capture video (e.g., video of the customer) and send a corresponding video stream over network 120 to conferencing system 130. Similarly, a microphone associated with customer endpoint 110(1) may capture audio (e.g., audio of the customer) and send a corresponding audio stream over network 120 to conferencing system 130. Endpoint 110(1) may also receive a video stream from conferencing system 130 and output the corresponding video at a display screen associated with customer endpoint 110(1). Similarly, endpoint 110(1) may also receive an audio stream from conferencing system 130 and output the corresponding audio at a speaker associated with customer endpoint 110(1). Trainer endpoint 110(2) and trainee endpoint 110(3) may perform similar operations with respect to audio/video stream 180(2) and audio/video stream 180(3). Endpoints 110(1)-130(3) may also exchange control streams 190(1)-190(3) with conferencing system 130 to manage the video conference session.

Conferencing system 130 also includes content sharing logic 195. Content sharing logic 195 causes conferencing system 130 to perform content sharing operations in accordance with the techniques described herein. In particular, content sharing logic 195 may cause conferencing system 130 to permit selective content sharing during the video conference session.

In one example, conferencing system 130 may obtain customer display content (e.g., video) from customer endpoint 110(1). The customer display content may include content from the customer side that illustrates the customer issue and/or helps the trainer resolve the issue. The customer display content may include content currently displayed on the desktop of customer endpoint 110(1). The customer display content may be limited to one window/application or multiple select applications; or the customer display content may include the entire desktop. Conferencing system 130 may stream the customer display content to trainer endpoint 110(2).

Conferencing system 130 further obtains trainer display content from trainer endpoint 110(2). The trainer display content may include content from the trainer side that shows how the trainer is resolving the customer issue, such as internal tools and processes. The trainer display content may include content currently displayed on the desktop of trainer endpoint 110(2). The trainer display content may be limited to one application or multiple select applications; or the trainer display content may include the entire desktop.

While streaming the customer display content to trainer endpoint 110(2), conferencing system 130 streams the trainer display content to trainee endpoint 110(3) and prevents streaming of the trainer display content to customer endpoint 110(1). Streaming the trainer display content to trainee endpoint 110(3) may enable the trainee to observe both the customer display content and the trainer display content. Preventing streaming of the trainer display content to customer endpoint 110(1) may ensure that the presence of the trainee remains undetected by the customer.

Figure 2:
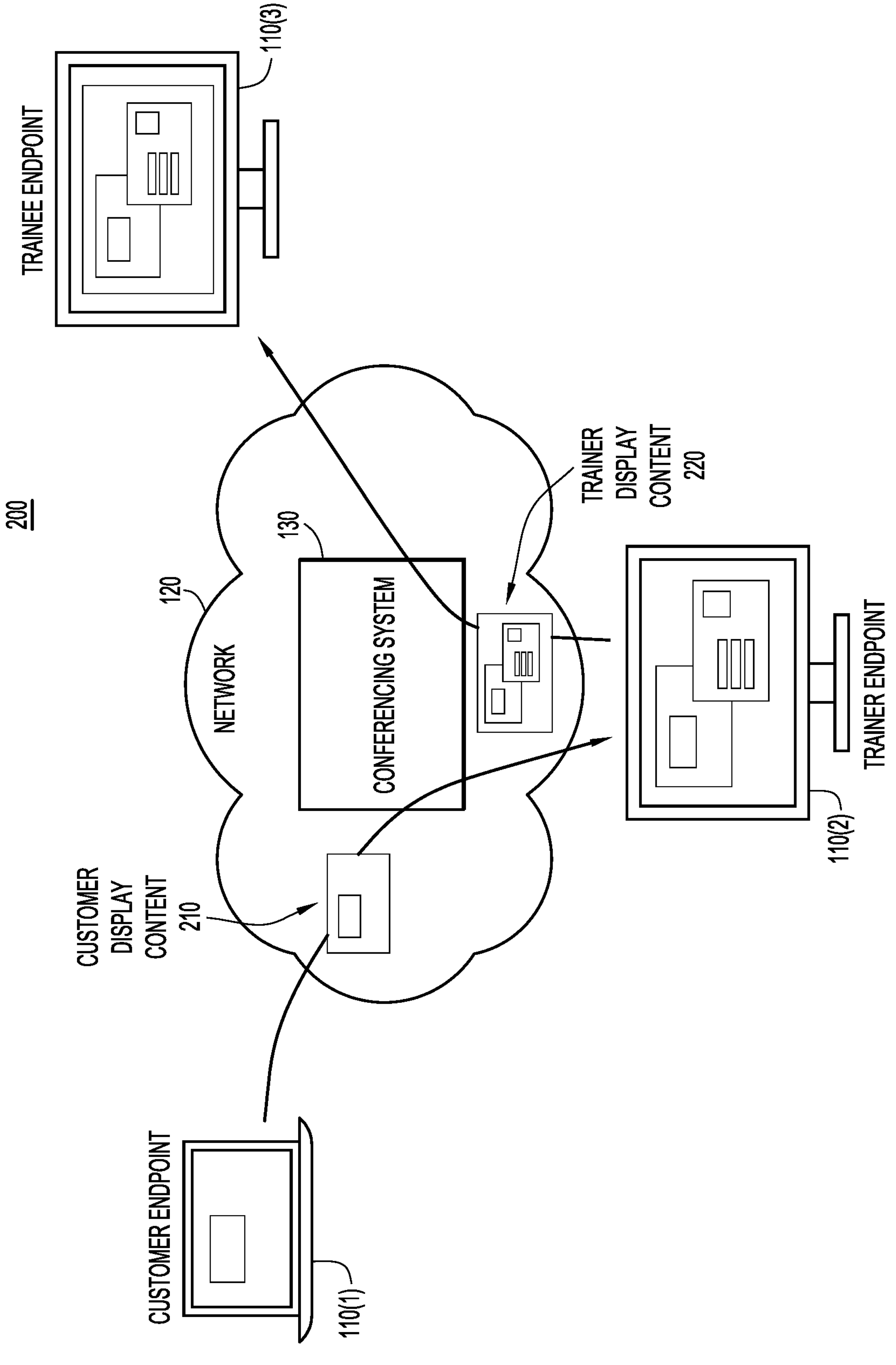
FIG. 2 illustrates a system for selective cascaded content sharing in a video conference, according to an example embodiment.

FIG. 2 illustrates an example system 200 for selective cascaded content sharing in a video conference. System 200 includes endpoints 110(1)-110(3), network 120, and conferencing system 130. In this example, the customer shares customer display content 210 from customer endpoint 110 (1) to trainer endpoint 110(2), and the trainer shares trainer display content 220 from trainer endpoint 110(2) to trainee endpoint 110(3). Trainer display content 220 may include any suitable content that the trainer wishes to share. In one example, trainer display content 220 may include a single unified stream of both customer display content 210 (or at least a portion thereof) and additional content illustrating how the trainer is researching/resolving the customer issue. For instance, trainer display content 220 may include the entire trainer desktop. Thus, system 200 may enable the trainee to view information related to the customer issue in the same way that the trainer views that information. The trainee may view trainer display content 220 in any suitable layout.

In one example, conferencing system 130 obtains customer display content 210 from customer endpoint 110(1), and streams customer display content 210 to trainer endpoint 110(2). Conferencing system 130 further obtains trainer display content 220, which includes at least a portion of customer display content 210. While streaming customer display content 210, conferencing system 130 streams trainer display content 220—including at least a portion of customer display content 210—to trainee endpoint 110(3). Conferencing system 130 also prevents streaming of trainer display content 220 to customer endpoint 110(1).

Figure 3:
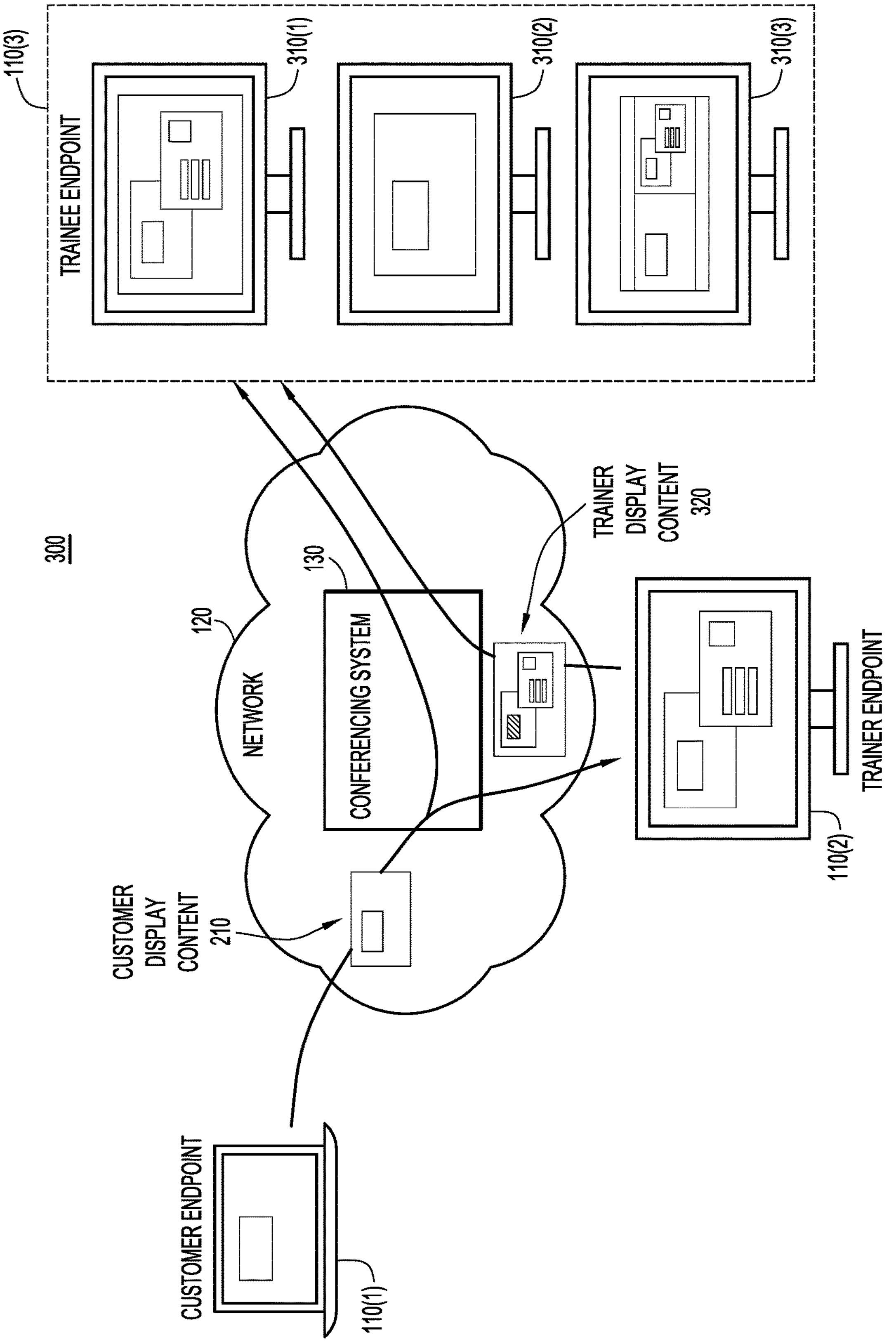
FIG. 3 illustrates a system for selective combinational content sharing in a video conference, according to an example embodiment.

FIG. 3 illustrates an example system 300 for selective combinational content sharing in a video conference. System 300 includes endpoints 110(1)-110(3), network 120, and conferencing system 130. In this example, the customer shares a first copy of customer display content 210 with the trainer. The trainer may invite the trainee to the video conference session (unbeknownst to the customer), and conferencing system 130 may share a second copy of customer display content 210 to the trainee. Thus, conferencing system 130 may direct customer display content 210 to both trainer endpoint 110(2) and trainee endpoint 110(3).

Meanwhile, the trainer may also share the trainer display content 320 with the trainee. Accordingly, upon joining the video conference support session, the trainee receives a copy of customer display content 210 from the customer and, independently, receives trainer display content 320 from the trainer. The trainee may view and/or arrange any combination of customer display content 210 and trainer display content 320 at full resolution.

In a first example, a display screen associated with trainee endpoint 110(3) may display view 310(1) showing trainer display content 320. In a second example, the display screen associated with trainee endpoint 110(3) may display view 310(2) showing customer display content 210. In a third example, the display screen associated with trainee endpoint 110(3) may display view 310(3) showing customer display content 210 and trainer display content 320 side-by-side. The trainee may dynamically switch between views 310(1)-310(3) or any other suitable view (e.g., picture-in-picture). The trainee may decide which view 310(1)-310(3) to use based on the size of the display screen associated with trainee endpoint 110(3), the personal preferences of the trainee, etc.

In one example, conferencing system 130 obtains customer display content 210 from customer endpoint 110(1). Conferencing system 130 may generate first and second copies of customer display content 210. Conferencing system 130 may stream the first copy of customer display content 210 to trainer endpoint 110(2). While streaming the first copy of customer display content 210 to trainer endpoint 110(2), conferencing system 130 may further stream the second copy of customer display content 210 to trainee endpoint 110(3).

Conferencing system 130 further obtains trainer display content 320 from trainer endpoint 110(2). While streaming the first copy of customer display content 210 to trainer endpoint 110(2), and while streaming the second copy of customer display content 210 to trainee endpoint 110(3), conferencing system 130 may stream trainer display content 320 to trainee endpoint 110(3). Conferencing system 130 also prevents streaming of trainer display content 320 to customer endpoint 110(1).

In system 300 (combinational sharing), conferencing system 130 streams two copies of customer display content 210; in system 200 (cascaded sharing), conferencing system 130 streams one copy of customer display content 210. As a result, system 300 may offer more trainee viewing flexibility than system 200, but may also use more bandwidth and processing resources. To minimize the additional bandwidth/processing resources used in system 300, conferencing system 130 may optionally stream trainer display content 320 with at least a portion of the first copy of customer display content 210 omitted from trainer display content 320. That is, if the trainer has customer display content 210 (or a portion thereof) displayed on a display screen associated with trainer endpoint 110(2), customer display content 210 may be excluded from trainer display content 320 sent to trainee endpoint 110(3). Including customer display content 210 in trainer display content 320 may be redundant because trainee endpoint 110(3) is already receiving the second copy of customer display content directly from customer endpoint 110(1). Trainer endpoint 110(2) may omit the first copy of customer display content 210 from trainer display content 320 based on the display location of customer display content on the display screen associated with trainer endpoint 110(2).

Upon receiving trainer display content 320—with customer display content 210 omitted—trainee endpoint 110(3) may digitally stitch customer display content 210 back into trainer display content 320. For example, trainee endpoint 110(3) may insert the second copy of customer display content 210, which was received directly from customer endpoint 110(1), into the display of trainer display content 320. Thus, a display screen associated with trainee endpoint 110(3) may mirror a display screen associated with trainer endpoint 110(2), even if customer display content 210 is omitted from trainer display content 320. Rapidly refreshing customer display content 210 may reduce latency on the display screen associated with trainee endpoint 110(3), particularly during log-scrolling, video playback, etc.

In one example, conferencing system 130 may determine whether to use cascaded sharing or combinational sharing. Conferencing system 130 may determine whether to use cascaded sharing or combinational sharing before and/or during the video conference session based on the available bandwidth in network 120, the processing capabilities of trainer endpoint 110(2) and/or trainee endpoint 110(3), etc.

Conferencing system 130 may automatically switch between cascaded sharing and combinational sharing, or may permit a user (e.g., the trainer or trainee) to choose. For example, if only a limited amount of bandwidth in network 120 is available at the start of the telecommunication session, conferencing system 130 may automatically implement cascaded sharing. If more bandwidth becomes available at some point during the meeting, then at that time conferencing system 130 may automatically switch to combinational sharing, or ask the trainee if the trainee would like to switch to combinational sharing.

Figure 4:
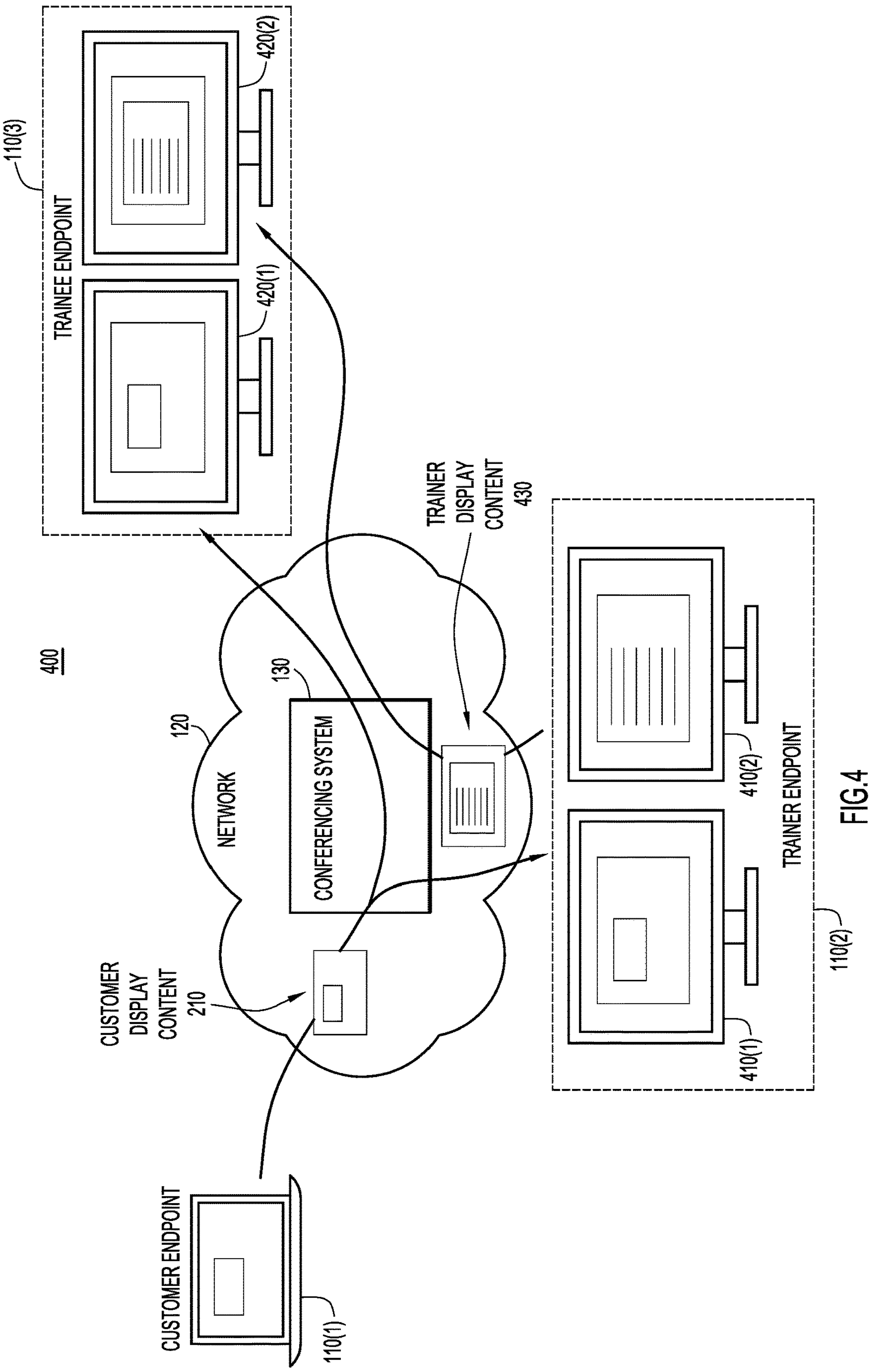
FIG. 4 illustrates another system for selective combinational content sharing in a video conference, according to an example embodiment.

FIG. 4 illustrates another example system 400 for selective combinational content sharing in a video conference. System 400 includes endpoints 110(1)-110(3), network 120, and conferencing system 130. System 400 further includes display screens 410(1) and 410(2) associated with trainer endpoint 110(2), and display screens 420(1) and 420(2) associated with trainee endpoint 110(3). In this example, trainer and trainee both have a dual-monitor setup: the trainer uses display screens 410(1) and 410(2), and the trainee uses display screens 420(1) and 420(2).

Conferencing system 130 may obtain customer display content 210 from customer endpoint 110(1). Like in system 300, conferencing system 130 may generate first and second copies of customer display content 210. Conferencing system 130 may stream the first copy of customer display content 210 to trainer endpoint 110(2) for display on display screen 410(1). While streaming the first copy of customer display content 210 to trainer endpoint 110(2), conferencing system 130 may further stream the second copy of customer display content 210 to trainee endpoint 110(3) for display on display screen 420(1).

The trainer may also elect to share trainer display content 430 with the trainee. Conferencing system 130 obtains trainer display content 430, which is displayed on display screen 410(2). While streaming the first copy of customer display content 210 to trainer endpoint 110(2), and while streaming the second copy of customer display content 210 to trainee endpoint 110(3), conferencing system 130 may stream trainer display content 430 to trainee endpoint 110(3) for display on display screen 420(2). Conferencing system 130 also prevents streaming of trainer display content 430 to customer endpoint 110(1).

Thus, the trainee dual-monitor setup may mirror the trainer dual-monitor setup: display screens 410(1) and 420(1) show customer display content 210, and display screens 410(2) and 420(2) show trainer display content 430. The trainee may rearrange the display in any suitable manner. The techniques described herein may be used in conjunction with any suitable number of monitors or windows.

Figure 5:
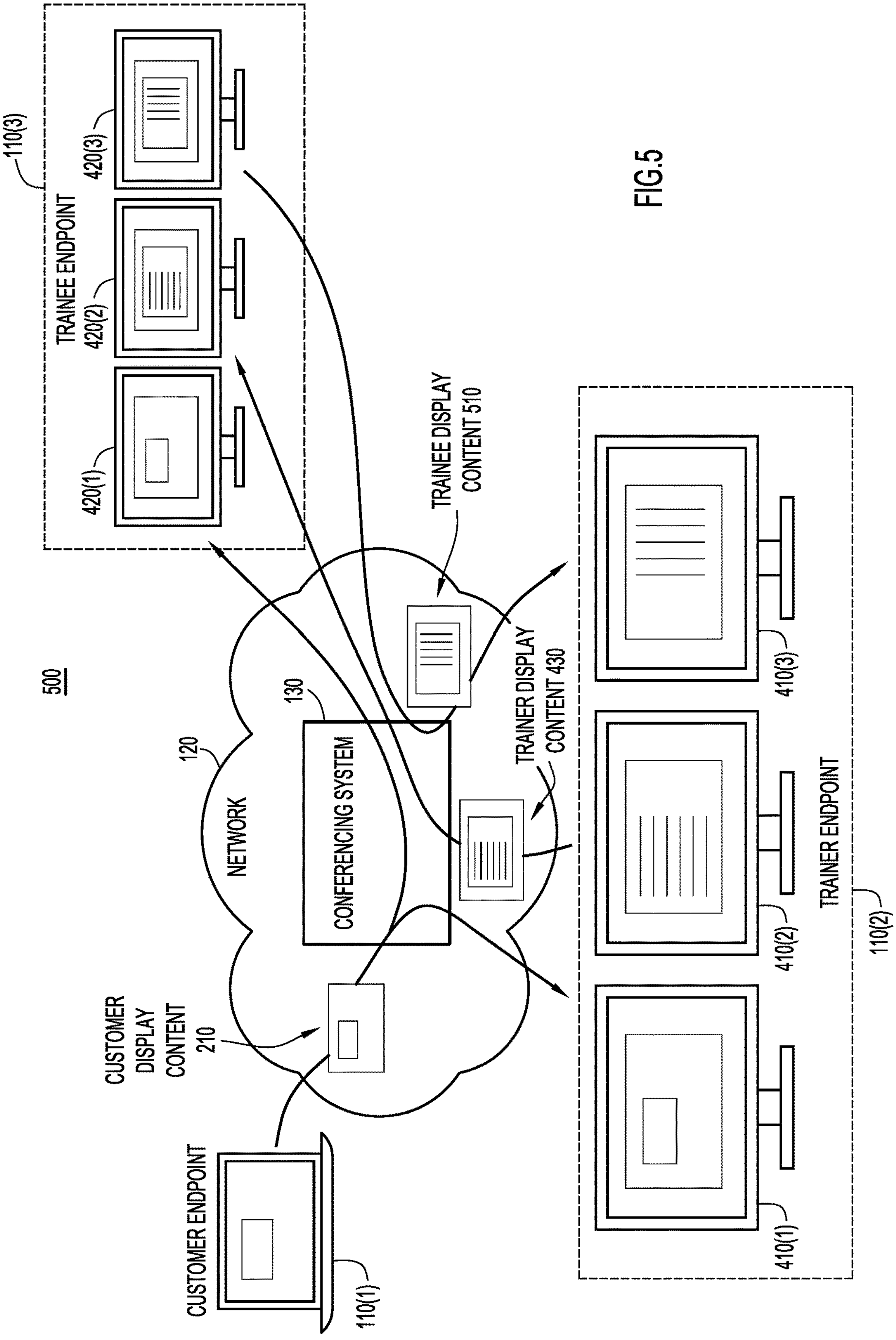
FIG. 5 illustrates a system for selective content sharing from a trainee to a trainer in a video conference, according to an example embodiment.

FIG. 5 illustrates an example system 500 for selective content sharing in a video conference, including content sharing from the trainee to the trainer. Like system 400, system 500 includes endpoints 110(1)-110(3), network 120, conferencing system 130, display screens 410(1) and 410(2) associated with trainer endpoint 110(2), and display screens 420(1) and 420(2) associated with trainee endpoint 110(3). System 500 further includes display screen 410(3) associated with trainer endpoint 110(2), and display screen 420(3) associated with trainee endpoint 110(3). Thus, in this example, the trainer and trainee both have a tri-monitor setup: the trainer uses display screens 410(1)-410(3), and the trainee uses display screens 420(1)-420(3). The tri-monitor setup is merely illustrative; the techniques described herein may be implemented regardless of the number of monitors that are being used by the trainer and trainee.

Like in system 400, conferencing system 130 may obtain customer display content 210 from customer endpoint 110(1), generate first and second copies of customer display content 210, and simultaneously stream the first copy of customer display content 210 to trainer endpoint 110(2) for display on display screen 410(1), and the second copy of customer display content 210 to trainee endpoint 110(3) for display on display screen 420(1). Conferencing system 130 may further obtain trainer display content 430 and simultaneously stream trainer display content 430 to trainee endpoint 110(3) for display on display screen 420(2). Conferencing system 130 also prevents streaming of trainer display content 430 to customer endpoint 110(1).

Conferencing system 130 may also obtain trainee display content 510, which is displayed on display screen 420(3). Trainee display content 510 may display research the trainee is performing on the customer issue to assist the trainer and better facilitate an on-the-job learning experience. While streaming the first copy of customer display content 210 to trainer endpoint 110(2), conferencing system 130 may stream trainee display content 510 to trainer endpoint 110(2). This may assist the trainer in quickly resolving the customer issue and also help the trainee to learn how to perform the functions of the trainee's job. Conferencing system 130 may further prevent streaming of trainee display content 510 to customer endpoint 110(1) to hide the trainee's presence from the customer.

In one example, the trainer may share trainer display content 430 with the trainee at the same time the trainee shares trainee display content 510 with the trainer. In other examples, conferencing system 130 may permit sharing of either trainer display content 430 or trainee display content 510 at any given time. Trainee display content may be echoed back to the trainer using any suitable sharing technique (e.g., cascaded sharing, combinational sharing, any variation of cascaded or combinational sharing, etc.).

Figure 6:
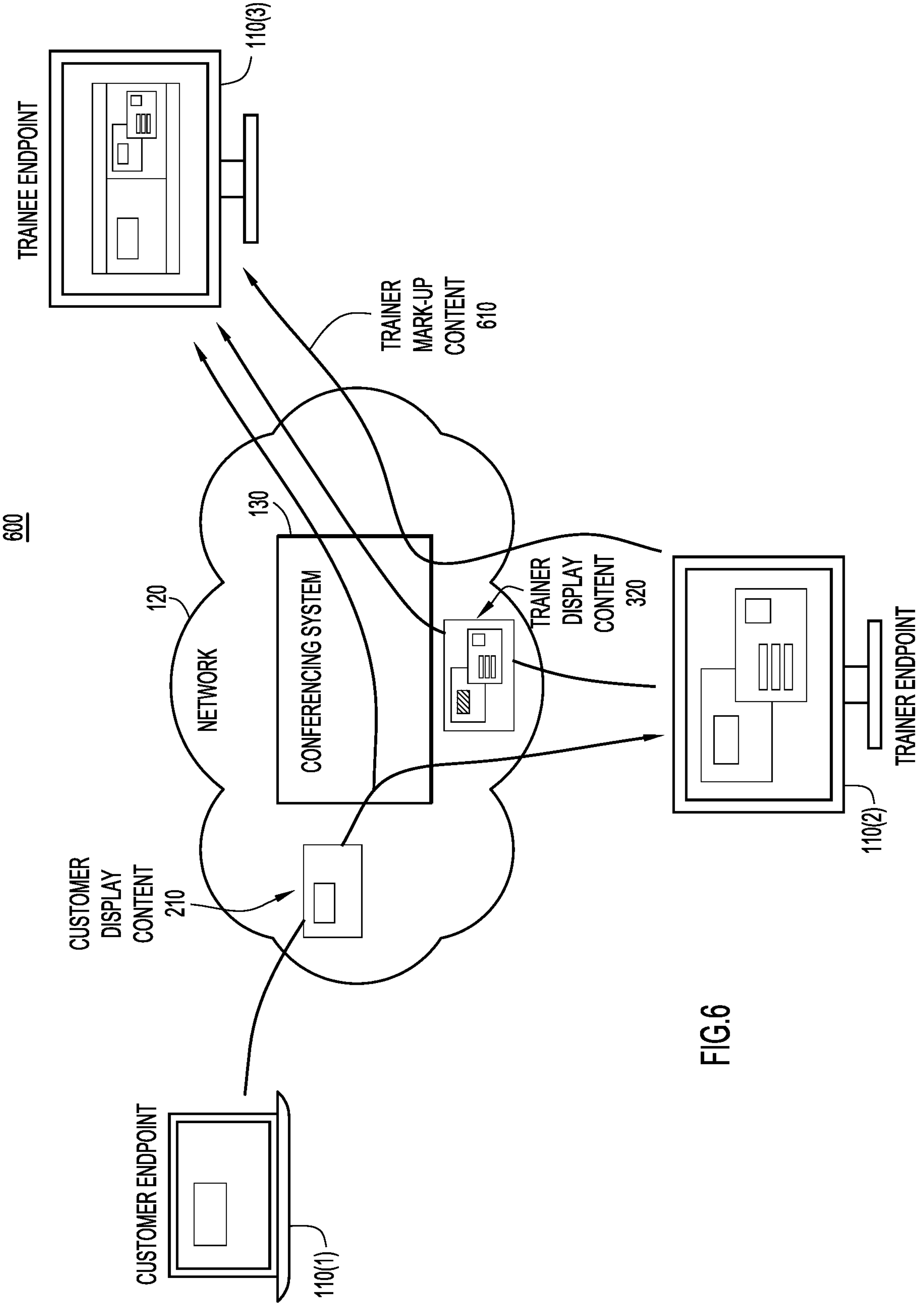
FIG. 6 illustrates a system for selective mark-up content sharing in a video conference, according to an example embodiment.

FIG. 6 illustrates an example system 600 for selective mark-up content sharing in a video conference. Like system 300, system 600 includes endpoints 110(1)-110(3), network 120, and conferencing system 130. Conferencing system 130 may obtain customer display content 210 from customer endpoint 110(1), generate first and second copies of customer display content 210, and simultaneously stream the first copy of customer display content 210 to trainer endpoint 110(2), and the second copy of customer display content 210 to trainee endpoint 110(3). Conferencing system 130 may also obtain trainer display content 320 and simultaneously stream trainer display content 320 to trainee endpoint 110(3). Conferencing system 130 may further prevent streaming of trainer display content 320 to customer endpoint 110(1) and, optionally, stream trainer display content 320 with at least a portion of the first copy of customer display content 210 omitted from trainer display content 320.

The trainer may also mark-up/annotate trainer display content 320. The mark-ups may include any suitable information to help to trainer point out and explain information to the trainee about resolving the customer support issue. In one example, conferencing system 130 may obtain trainer mark-up content 610 (e.g., the trainer's mark-ups) from trainer endpoint 110(2). Conferencing system 130 may further provide trainer mark-up content 610 to trainee endpoint 110(3). For instance, if the trainer and trainee are looking at ninety lines of terminal output and 5000 characters, the trainer may use the mark-ups to highlight one incorrect hex value. Conferencing system 130 may prevent trainer mark-up content 610 from being provided to customer endpoint 110(1), so that trainer mark-up content 610 is visible only to the trainee. This may permit the trainee to remain hidden from the customer.

Mark-up content may not necessarily be limited to sharing from only the trainer to the trainee. For example, trainee mark-up content may also be shared in the reverse direction (i.e., from the trainee to the trainer). In that case, conferencing system 130 may also prevent the trainee mark-up content from being provided to customer endpoint 110(1). Mark-up content may be shared in conjunction with any suitable sharing technique (e.g., cascaded sharing, combinational sharing, any variation of cascaded or combinational sharing, etc.). Furthermore, mark-up content may be shared regardless of the specific number of display screens that are being used by the trainer and the trainee.

Figure 7:
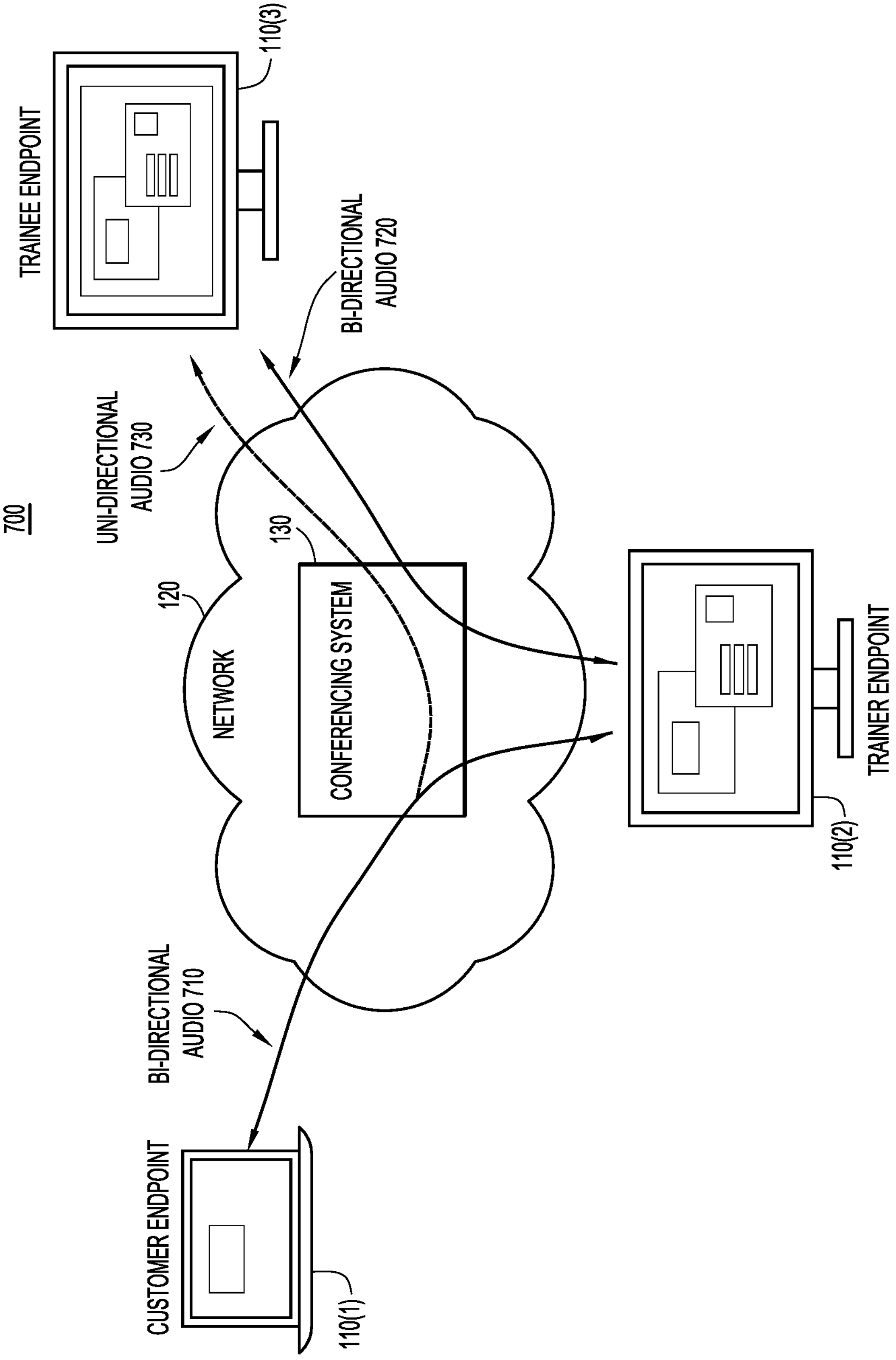
FIG. 7 illustrates a system for selective audio content sharing in a video conference, according to an example embodiment.

FIG. 7 illustrates an example system 700 for selective audio content sharing in a video conference. System 700 includes endpoints 110(1)-110(3), network 120, and conferencing system 130. In this example, endpoints 110(1)-110(3) may share display and/or mark-up content in accordance with any suitable techniques described herein.

System 700 also enables audio sharing. In one example, conferencing system 130 transmits bi-directional audio 710 between customer endpoint 110(1) and trainer endpoint 110(2); bi-directional audio 720 between trainer endpoint 110(2) and trainee endpoint 110(3); and uni-directional audio 730 from customer endpoint 110(1) to trainee endpoint 110(3). Thus, the trainee may hear both the customer and the trainer (bi-directional audio 720 and uni-directional audio 730); the trainer may hear both the trainee and the customer (bi-directional audio 710 and bi-directional audio 720); and the customer may hear the trainer (bi-directional audio 710) but not the trainee (uni-directional audio 730).

In other words, conferencing system 130 creates a separate/side audio channel for the trainer and the trainee to communicate via audio. Conferencing system 130 may establish the side audio channel when the trainees are admitted into the video conference session. In one example, conferencing system 130 may obtain audio from trainee endpoint 110(3) and provide the audio to trainer endpoint 110(2) while preventing the audio from being provided to customer endpoint 110(1). This capability allows for the trainer to point out and explain information to the trainee.

In some cases, one or more of the users (e.g., the customer, trainer, and/or trainee) may join the video conference with multiple endpoints. For example, the user(s) may join with a laptop to display/share content and call in separately with a cell phone to send and receive audio. In these cases, endpoints 110(1)-110(3) (e.g., laptops) may be configured for displaying content but not for outputting audio in the video conference session. Thus, instead of streaming (or prevent streaming of) audio between endpoints 110(1)-110(3), conferencing system 130 may stream (or prevent streaming of) audio between endpoint devices associated with the respective users of endpoints 110(1)-110(3) (e.g., cell phones).

In one example, conferencing system 130 may provide the trainer with an option to speak to the customer (with the trainee listening) or speak to the trainee (without the customer listening). The trainee may speak only to the trainer, though the trainer may also have an option to enable the customer to hear the trainee (e.g., to change uni-directional audio 730 to bi-directional audio), if desired. The trainer may select one or more buttons in a graphical user interface to control these options.

Figure 8A:
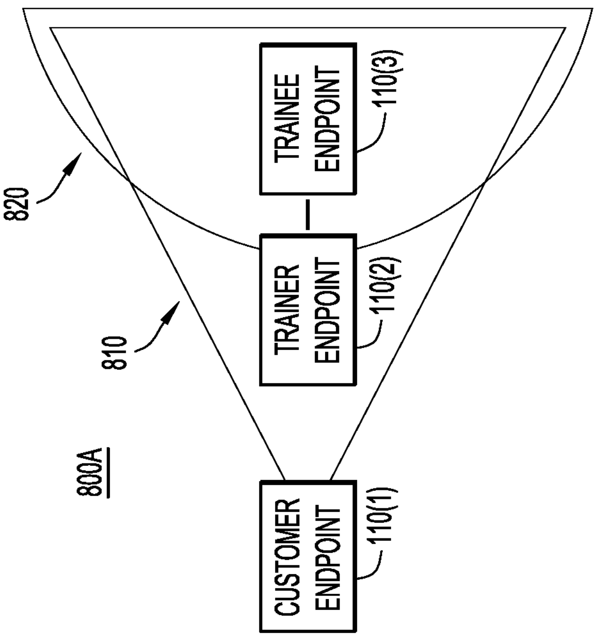
FIGS. 8A-8C illustrate respective systems for selective audio content sharing in a video conference between a customer, a trainer, and one or more trainees, according to an example embodiment.
Figure 8B:
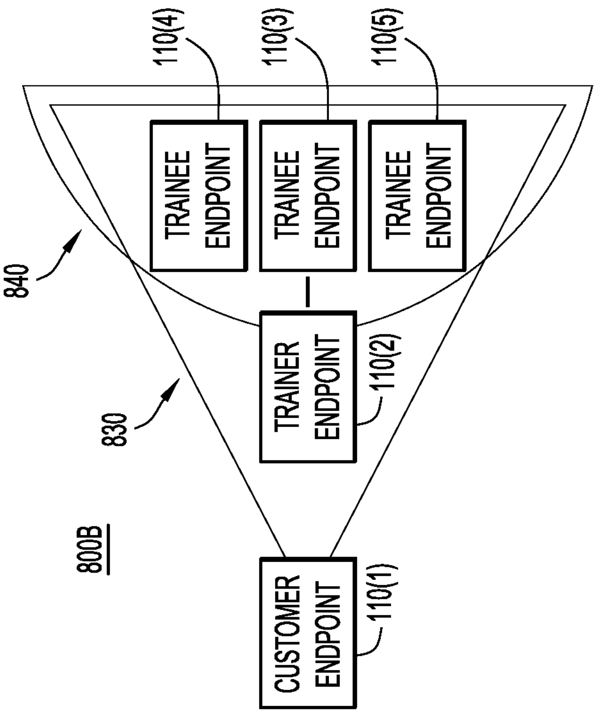
Figure 8C:
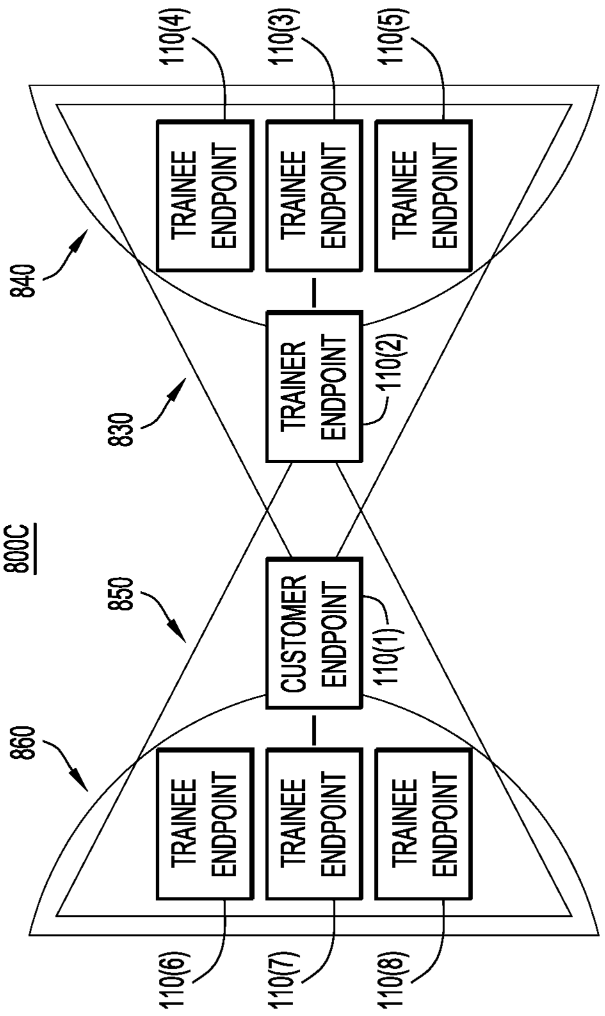

FIGS. 8A-8C illustrate respective example systems 800A-800C for selective content sharing in a video conference between a customer, a trainer, and one or more trainees. System 800A illustrates audio segmentation for an implementation involving one trainer and one trainee. As represented by shaded region 810, conferencing system 130 may permit trainee endpoint 110(3) to obtain audio from both customer endpoint 110(1) and trainer endpoint 110(2). As represented by shaded region 820, conferencing system 130 may ensure that audio generated by trainee endpoint 110(3) remains localized to trainer endpoint 110(2) and trainee endpoint 110(3).

System 800B illustrates audio segmentation for an implementation involving one trainer and multiple trainees. In this example, the trainer may train multiple trainees during the same video conference session. Specifically, system 800B includes trainee endpoints 110(3)-110(5), each of which may be associated with a respective trainee.

As represented by shaded region 830, conferencing system 130 may permit trainee endpoints 110(3)-110(5) to obtain audio from both customer endpoint 110(1) and trainer endpoint 110(2). As represented by shaded region 840, conferencing system 130 may ensure that audio generated by trainee endpoints 110(3)-110(5) remains localized to trainer endpoint 110(2) and trainee endpoints 110(3)-110(5). Conferencing system 130 may permit the trainees to communicate with each other and/or with the trainer via audio; however, conferencing system 130 may prohibit the trainees from communicating with the customer.

System 800C illustrates audio segmentation for an implementation involving multiple trainers and multiple trainees. In this example, while the trainer is training multiple trainees on the trainer-side, the customer may train multiple trainees on the customer-side during the same video conference session. Specifically, system 800C includes trainee endpoints 110(6)-110(8), each of which may be associated with a respective trainee being trained by the customer. Thus, system 800C is flexible in allowing techniques described herein to be performed on the customer-side in addition to the trainer-side.

As represented by shaded region 850, conferencing system 130 may permit trainee endpoints 110(6)-110(8) to obtain audio from both customer endpoint 110(1) and trainer endpoint 110(2). As represented by shaded region 860, conferencing system 130 may ensure that audio generated by trainee endpoints 110(6)-110(8) remains localized to customer endpoint 110(1) and trainee endpoints 110(6)-110(8). Thus, conferencing system 130 may permit the customer-side trainees to communicate with each other and/or the customer via audio; however, conferencing system 130 may prohibit the customer-side trainees from communicating with the trainer.

While three trainer-side trainee endpoints (trainee endpoints 110(3)-110(5)) are illustrated in system 800B and system 800C, the trainer may train any suitable number of trainees during the same video conference session. Likewise, while three customer-side trainee endpoints (trainee endpoints 110(6)-110(8)) are illustrated in system 800C, the customer may train any suitable number of trainees during the same video conference session. Furthermore, while two sides are illustrated in systems 800A-800C (i.e., the customer-side and the trainer-side), any suitable number of sides (e.g., trainers) may join a video conference session and train any suitable number of trainees in accordance with the techniques described herein.

Figure 9:
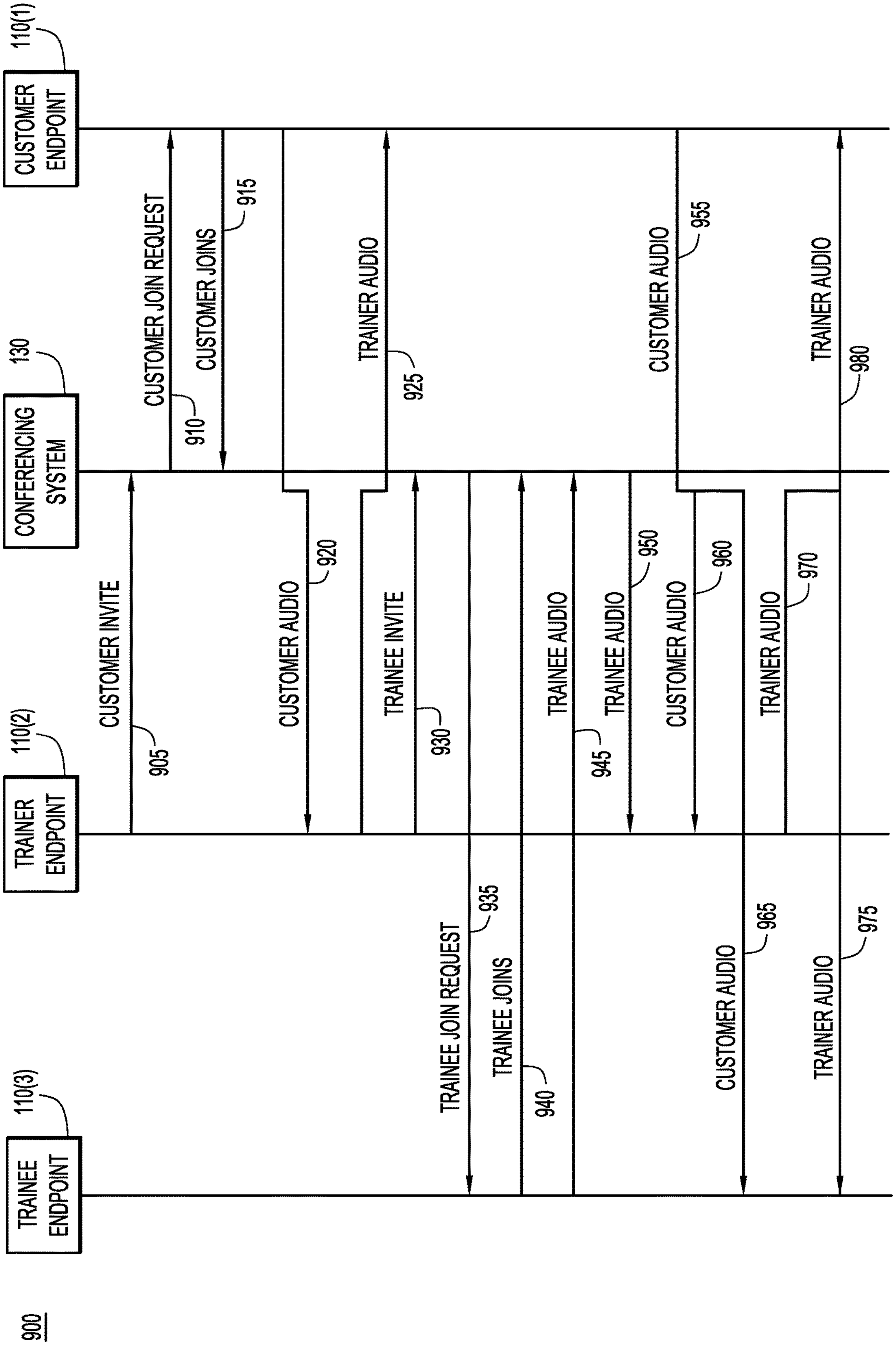
FIG. 9 illustrates a sequence diagram of a method for selective content sharing in a video conference, according to an example embodiment.

FIG. 9 illustrates an example sequence diagram of a method 900 for selective content sharing in a video conference. In particular, FIG. 9 illustrates an example order of operations for audio flow during a video conference session.

Method 900 involves operations between endpoints 110(1)-110(3), though method 900 may be extended to account for additional endpoints on the trainer-side and/or the customer-side (e.g., trainee endpoints 110(4)-110(8)).

At operation 905, conferencing system 130 obtains, from trainer endpoint 110(2), an invitation for the customer to join a video conference session. At operation 910, conferencing system 130 provides, to customer endpoint 110(1), a customer join request for the customer to join the video conference session. At operation 915, conferencing system 130 obtains, from customer endpoint 110(1), an indication that the customer has joined the video conference session.

At operation 920, conferencing system 130 obtains customer audio from customer endpoint 110(1) and provides the customer audio to trainer endpoint 110(2). At operation 925, conferencing system 130 obtains trainer audio from trainer endpoint 110(2) and provides the trainer audio to customer endpoint 110(1). Thus, the trainer and customer can hear audio from each other.

At operation 930, conferencing system 130 obtains, from trainer endpoint 110(2), an invitation for the trainee to join the video conference session. At operation 935, conferencing system 130 provides to trainee endpoint 110(3), a trainee join request for the trainee to join the video conference session. At operation 940, conferencing system 130 obtains, from trainee endpoint 110(3), an indication that the customer has joined the video conference session.

At operation 945, conferencing system 130 obtains trainee audio from trainee endpoint 110(3). At operation 950, conferencing system 130 provides the trainee audio to trainer endpoint 110(2), but not to customer endpoint 110(1). Thus, the trainer, but not the customer, can hear audio from the trainee.

At operation 955, conferencing system 130 obtains customer audio from customer endpoint 110(1). At operation 960, conferencing system 130 provides the customer audio to trainer endpoint 110(2); at operation 965, conferencing system 130 provides the customer audio to trainee endpoint 110(3). Thus, both the trainer and the trainee can hear audio from the customer.

At operation 970, conferencing system 130 obtains trainer audio from trainer endpoint 110(2). At operation 975, conferencing system 130 provides the trainer audio to trainee endpoint 110(3); at operation 980, conferencing system 130 provides the trainer audio to customer endpoint 110(1). Thus, both the trainee and the customer can hear audio from the trainer.

Audio joining may occur in any suitable order. For example, conferencing system 130 may establish the trainee's audio session before, after, or simultaneously with the customer's audio session. The order in which the users join the video conference via audio may depend on when the users manually add their respective audio feeds. For instance, a user may select an option (e.g., click a button) to establish an audio connection to join the video conference—at which point another user may already have established an audio connection. Alternatively, the audio join may occur automatically (e.g., simultaneously with the user joining the video conference).

Figure 10:
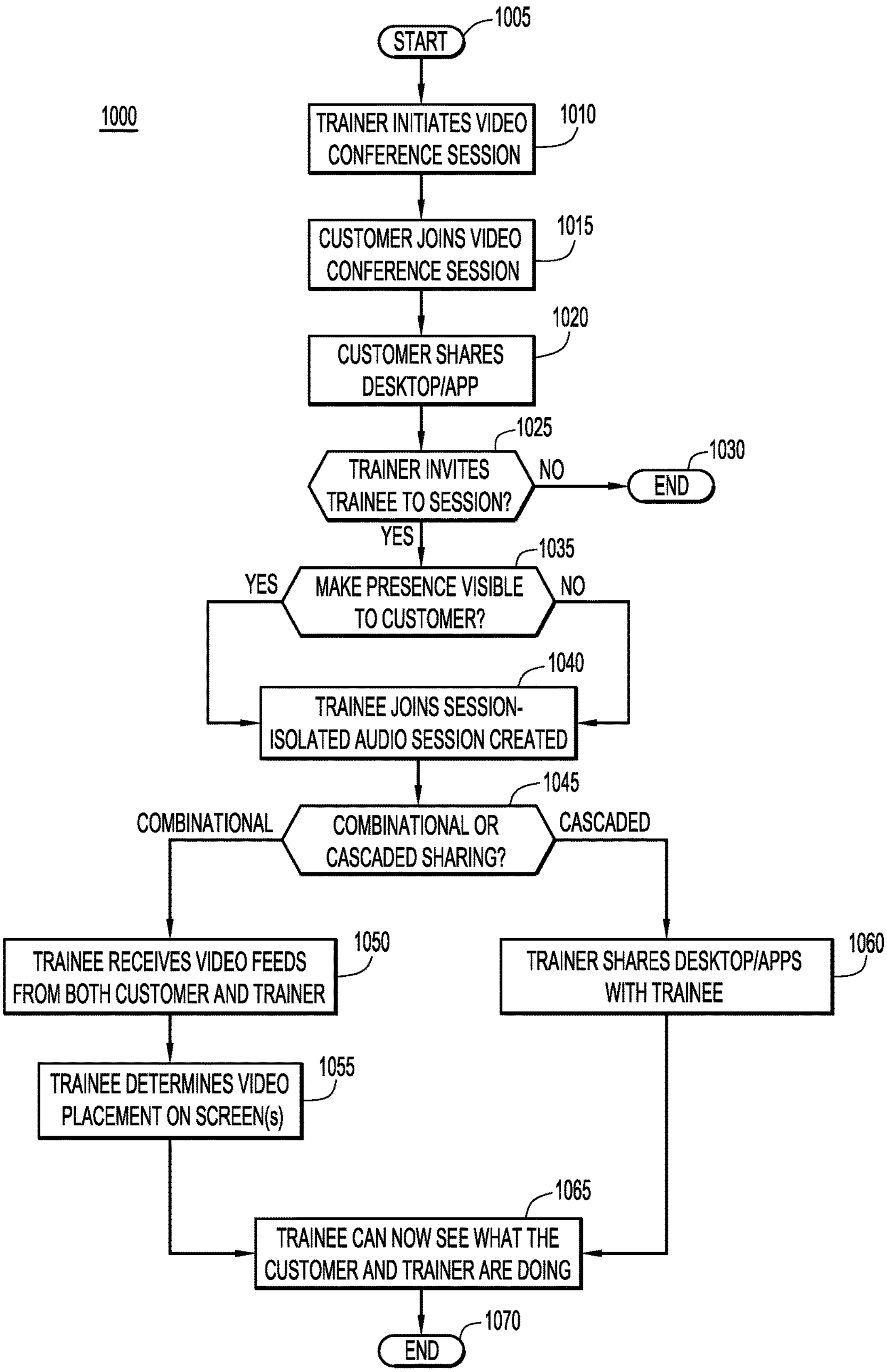
FIG. 10 illustrates a flowchart of a method for selective content sharing in a video conference, according to an example embodiment.

FIG. 10 illustrates an example flowchart of a method 1000 for selective content sharing in a video conference. In particular, method 1000 may enable initializing a multi-directional sharing session. Method 1000 starts at operation 1005. At operation 1010, the trainer initiates a video conference session (e.g., a support session) with the customer. At operation 1015, the customer joins the video conference session. At operation 1020, the customer shares a desktop or select application(s) associated with the customer. At operation 1025, the trainer has the option to invite/admit the trainee (or multiple trainees) to the video conference session. If the trainer does not invite the trainee to the video conference session, method 1000 ends at operation 1030.

If the trainer invites the trainee to the video conference session, then at operation 1035, the trainer has the option to make the trainee presence visible to the customer. Depending on the context of the video conference session, the trainee may remain invisible to the customer. In that case, the trainee may be visible to only the trainer, and may be indicated to the trainer as such. However, the trainer may have the option to toggle a button in a graphical user interface to control whether the trainee's presence is visible to the customer. Thus, the customer may or may not know that the trainee is present. In one example, the video conference session may incorporate roles for the trainer and the trainee, where the trainer may invite trainee to the meeting in a trainee role and may further specify whether the trainee is invisible to one or more other attendees (e.g., the customer).

Regardless of whether the trainer chooses to make the trainee session visible to the customer, at operation 1040 the trainee joins the video conference session, and an isolated audio session is created between the trainer and the trainee. At operation 1045, it is determined whether combinational or cascaded sharing is being implemented for the video conference session. If combinational sharing is being implemented, then at operation 1050 the trainee receives video feeds from both the customer and the trainer. At operation 1055, the trainee determines the appropriate placement of the respective video feeds on the trainee's display screen(s).

If cascaded sharing is being implemented, then at operation 1060, the trainer shares the trainer's desktop or select application(s) with the trainee (unbeknownst to the customer). Regardless of whether combinational or cascaded sharing is being implemented, at operation 1065, the trainee can now see what the customer and trainer are doing on their respective displays. Method 1000 ends at operation 1070.

Figure 11:
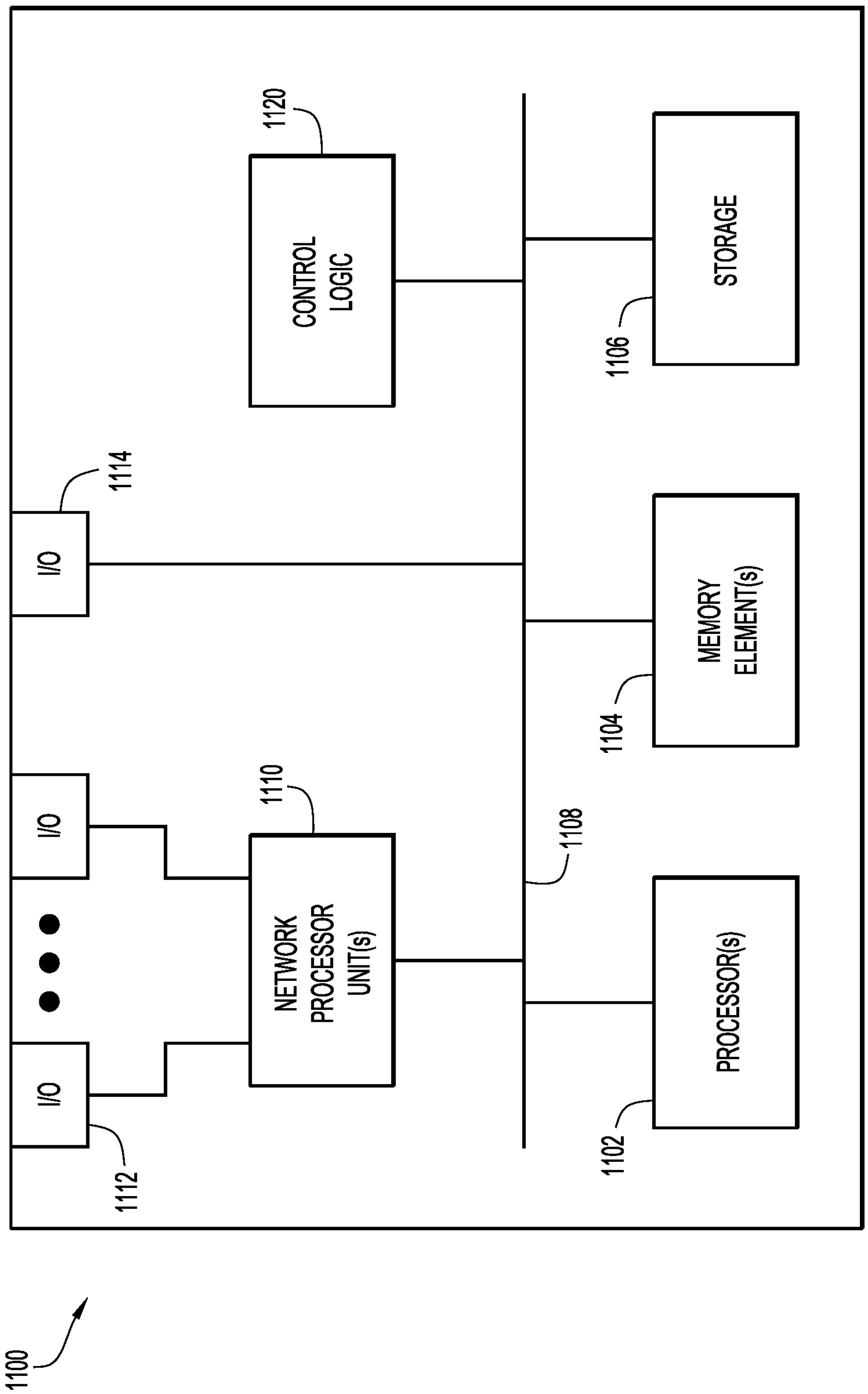
FIG. 11 illustrates a hardware block diagram of a computing device configured to perform functions associated with operations discussed herein, according to an example embodiment.

Referring to FIG. 11, FIG. 11 illustrates a hardware block diagram of a computing device 1100 that may perform functions associated with operations discussed herein in connection with the techniques depicted in FIGS. 1-10. In various embodiments, a computing device, such as computing device 1100 or any combination of computing devices 1100, may be configured as any entity/entities as discussed for the techniques depicted in connection with FIGS. 1-10 in order to perform operations of the various techniques discussed herein.

In at least one embodiment, computing device 1100 may include one or more processor(s) 1102, one or more memory element(s) 1104, storage 1106, a bus 1108, one or more network processor unit(s) 1110 interconnected with one or more network input/output (I/O) interface(s) 1112, one or more I/O interface(s) 1114, and control logic 1120. In various embodiments, instructions associated with logic for computing device 1100 can overlap in any manner and are not limited to the specific allocation of instructions and/or operations described herein.

In at least one embodiment, processor(s) 1102 is/are at least one hardware processor configured to execute various tasks, operations and/or functions for computing device 1100 as described herein according to software and/or instructions configured for computing device 1100. Processor(s) 1102 (e.g., a hardware processor) can execute any type of instructions associated with data to achieve the operations detailed herein. In one example, processor(s) 1102 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1104 and/or storage 1106 is/are configured to store data, information, software, and/or instructions associated with computing device 1100, and/or logic configured for memory element(s) 1104 and/or storage 1106. For example, any logic described herein (e.g., control logic 1120) can, in various embodiments, be stored for computing device 1100 using any combination of memory element(s) 1104 and/or storage 1106. Note that in some embodiments, storage 1106 can be consolidated with memory elements 1104 (or vice versa), or can overlap/exist in any other suitable manner.

In at least one embodiment, bus 1108 can be configured as an interface that enables one or more elements of computing device 1100 to communicate in order to exchange information and/or data. Bus 1108 can be implemented with any architecture designed for passing control, data and/or information between processors, memory elements/storage, peripheral devices, and/or any other hardware and/or software components that may be configured for computing device 1100. In at least one embodiment, bus 1108 may be implemented as a fast kernel-hosted interconnect, potentially using shared memory between processes (e.g., logic), which can enable efficient communication paths between the processes.

In various embodiments, network processor unit(s) 1110 may enable communication between computing device 1100 and other systems, entities, etc., via network I/O interface(s) 1112 to facilitate operations discussed for various embodiments described herein. In various embodiments, network processor unit(s) 1110 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1100 and other systems, entities, etc. to facilitate operations for various embodiments described herein. In various embodiments, network I/O interface(s) 1112 can be configured as one or more Ethernet port(s), Fibre Channel ports, and/or any other I/O port(s) now known or hereafter developed. Thus, the network processor unit(s) 1110 and/or network I/O interfaces 1112 may include suitable interfaces for receiving, transmitting, and/or otherwise communicating data and/or information in a network environment.

I/O interface(s) 1114 allow for input and output of data and/or information with other entities that may be connected to computing device 1100. For example, I/O interface(s) 1114 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1120 can include instructions that, when executed, cause processor(s) 1102 to perform operations, which can include, but not be limited to, providing overall control operations of computing device 1100; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1120) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 1104 and/or storage 1106 can store data, software, code, instructions (e.g., processor instructions), logic, parameters, combinations thereof, and/or the like used for operations described herein. This includes memory elements 1104 and/or storage 1106 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 1100 for transfer onto another computer readable storage medium.

Figure 12:
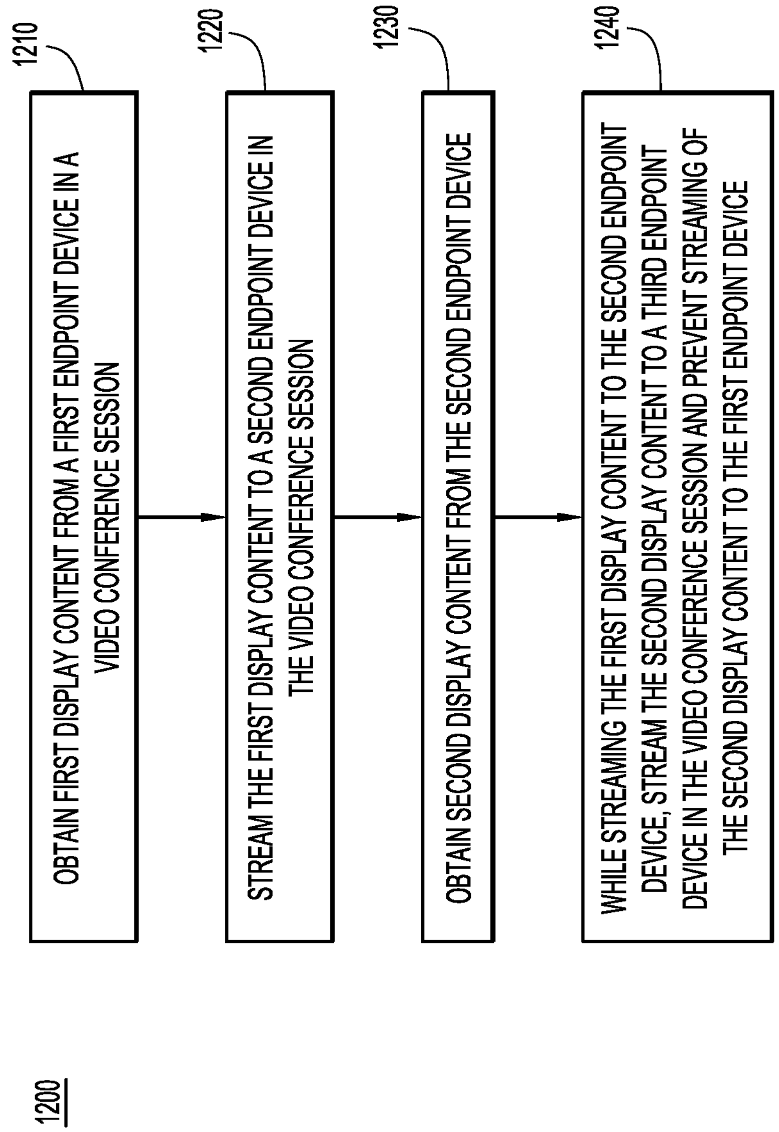
FIG. 12 illustrates a flowchart of a method for performing functions associated with operations discussed herein, according to an example embodiment.

FIG. 12 is a flowchart of an example method 1200 for performing functions associated with operations discussed herein. Method 1200 may be performed by any suitable entity, such as conferencing system 130. At operation 1210, conferencing system 130 obtains first display content from a first endpoint device in a video conference session. At operation 1220, conferencing system 130 streams the first display content to a second endpoint device in the video conference session. At operation 1230, conferencing system 130 obtains second display content from the second endpoint device. At operation 1240, while streaming the first display content to the second endpoint device, conferencing system 130 streams the second display content to a third endpoint device in the video conference session and prevents streaming of the second display content to the first endpoint device.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided. The method comprises: obtaining first display content from a first endpoint device in a video conference session; streaming the first display content to a second endpoint device in the video conference session; obtaining second display content from the second endpoint device; and while streaming the first display content to the second endpoint device, streaming the second display content to a third endpoint device in the video conference session and preventing streaming of the second display content to the first endpoint device.

In one example, the second display content includes at least a portion of the first display content, and streaming the second display content to the third endpoint device includes: streaming the at least the portion of the first display content to the third endpoint device.

In one example, streaming the first display content to the second endpoint device includes: streaming a first copy of the first display content to the second endpoint device, the method further comprising: while streaming the first copy of the first display content to the second endpoint device, and while streaming the second display content to the third endpoint device, streaming a second copy of the first display content to the third endpoint device.

In a further example, streaming the second display content to the third endpoint device includes: streaming the second display content with at least a portion of the first copy of the first display content omitted from the second display content.

In another further example, streaming the first copy of the first display content to the second endpoint device includes streaming the first copy of the first display content for display on a first display screen associated with the second endpoint device; streaming the second copy of the first display content to the third endpoint device includes streaming the second copy of the first display content for display on a first display screen associated the third endpoint device; and streaming the second display content to the third endpoint device includes streaming the second display content for display on a second display screen associated with the third endpoint device, wherein the second display content is displayed on a second display screen associated with the second endpoint device.

In one example, the method further comprises: obtaining third display content from the third endpoint device; and while streaming the first display content to the second endpoint device, streaming the third display content to the second endpoint device and preventing streaming of the third display content to the first endpoint device.

In one example, the method further comprises: obtaining, from the second endpoint device, mark-up content associated with the second display content; providing the mark-up content to the third endpoint device; and preventing providing of the mark-up content to the first endpoint device.

In one example, the method further comprises: obtaining audio from the third endpoint device or from an endpoint device associated with a third user of the third endpoint device; providing the audio to the second endpoint device or an endpoint device associated with a second user of the second endpoint device; and preventing providing of the audio to the first endpoint device or an endpoint device associated with a first user of the first endpoint device.

In another form, an apparatus is provided. The apparatus comprises: a network interface configured to obtain or provide network communications; and one or more processors coupled to the network interface, wherein the one or more processors are configured to: obtain first display content from a first endpoint device in a video conference session; stream the first display content to a second endpoint device in the video conference session; obtain second display content from the second endpoint device; and while streaming the first display content to the second endpoint device, stream the second display content to a third endpoint device in the video conference session and prevent streaming of the second display content to the first endpoint device.

In another form, one or more non-transitory computer readable storage media are provided. The non-transitory computer readable storage media are encoded with instructions that, when executed by a processor, cause the processor to: obtain first display content from a first endpoint device in a video conference session; stream the first display content to a second endpoint device in the video conference session; obtain second display content from the second endpoint device; and while streaming the first display content to the second endpoint device, stream the second display content to a third endpoint device in the video conference session and prevent streaming of the second display content to the first endpoint device.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

obtaining first display content for a video conference session from a first endpoint device, wherein the video conference session is one video conference session that includes the first endpoint device, a second endpoint device, and a third endpoint device;

streaming the first display content for the video conference session to the second endpoint device;

obtaining second display content for the video conference session from the second endpoint device;

determining an available network bandwidth for the video conference session;

determining whether to utilize cascaded content sharing or combinational content sharing for streaming the second display content for the video conference session to the third endpoint device based, at least in part, on the available network bandwidth for the video conference session; and while streaming the first display content for the video conference session to the second endpoint device, streaming the second display content for the video conference session to the third endpoint device utilizing the cascaded content sharing or the combinational content sharing while preventing the second display content for the video conference session from being streamed to the first endpoint device, wherein streaming the second display content for the video conference session to the third endpoint device is capable of being switched between the cascaded content sharing and the combinational content sharing based, at least in part, on the available network bandwidth for the video conference session.

2. The method of claim 1, wherein for the cascaded content sharing, the second display content for the video conference session includes at least a portion of the first display content for the video conference session, and wherein streaming the second display content for the video conference session to the third endpoint device includes:

streaming the at least the portion of the first display content for the video conference session to the third endpoint device.

3. The method of claim 1, wherein for the combinational content sharing, streaming the first display content for the video conference session to the second endpoint device includes:

streaming a first copy of the first display content for the video conference session to the second endpoint device, the method further comprising:

while streaming the first copy of the first display content for the video conference session to the second endpoint device, and while streaming the second display content for the video conference session to the third endpoint device while preventing the second display content for the video conference session from being streamed to the first endpoint device, streaming a second copy of the first display content for the video conference session to the third endpoint device.

4. The method of claim 3, wherein streaming the second display content for the video conference session to the third endpoint device includes:

streaming the second display content for the video conference session with at least a portion of the first copy of the first display content for the video conference session omitted from the second display content for the video conference session.

5. The method of claim 3, wherein:

streaming the first copy of the first display content for the video conference session to the second endpoint device includes streaming the first copy of the first display content for the video conference session for display on a first display screen associated with the second endpoint device;

streaming the second copy of the first display content for the video conference session to the third endpoint device includes streaming the second copy of the first display content for the video conference session for display on a first display screen associated the third endpoint device; and streaming the second display content for the video conference session to the third endpoint device includes streaming the second display content for the video conference session for display on a second display screen associated with the third endpoint device, wherein the second display content for the video conference session is displayed on a second display screen associated with the second endpoint device.

6. The method of claim 1, further comprising:

obtaining third display content for the video conference session from the third endpoint device; and while streaming the first display content for the video conference session to the second endpoint device, streaming the third display content for the video conference session to the second endpoint device while preventing the third display content for the video conference session from being streamed to the first endpoint device.

7. The method of claim 1, further comprising:

obtaining from the second endpoint device, mark-up content associated with the second display content for the video conference session; and providing the mark-up content to the third endpoint device while preventing the mark-up content from being provided to the first endpoint device.

8. The method of claim 1, further comprising:

obtaining audio for the video conference session from the third endpoint device or audio from an endpoint device associated with a third user of the third endpoint device;

providing the audio for the video conference session obtained from the third endpoint device or the audio from the endpoint device associated with the third user of the third endpoint device to the second endpoint device or an endpoint device associated with a second user of the second endpoint device while preventing the audio for the video conference session from the third endpoint device or the audio from the endpoint device associated with the third user of the third endpoint device from being provided to the first endpoint device or an endpoint device associated with a first user of the first endpoint device.

9. An apparatus comprising:

a network interface configured to obtain or provide network communications; and one or more processors coupled to the network interface, wherein the one or more processors are configured to:

obtain first display content for a video conference session from a first endpoint device wherein the video conference session is one video conference session that includes the first endpoint device, a second endpoint device, and a third endpoint device;

stream the first display content for the video conference session to the second endpoint device;

obtain second display content for the video conference session from the second endpoint device;

determine an available network bandwidth for the video conference session;

determine whether to utilize cascaded content sharing or combinational content sharing for streaming the second display content for the video conference session to the third endpoint device based, at least in part, on the available network bandwidth for the video conference session; and while streaming the first display content for the video conference session to the second endpoint device, stream the second display content for the video conference session to the third endpoint device utilizing the cascaded content sharing or the combinational content sharing while preventing the second display content for the video conference session from being streamed to the first endpoint device, wherein streaming the second display content for the video conference session to the third endpoint device is capable of being switched between the cascaded content sharing and the combinational content sharing based, at least in part, on the available network bandwidth for the video conference session.

10. The apparatus of claim 9, wherein for the cascaded content sharing, the second display content for the video conference session includes at least a portion of the first display content for the video conference session, and wherein the one or more processors are configured to:

stream the at least the portion of the first display content for the video conference session to the third endpoint device.

11. The apparatus of claim 9, wherein for the combinational content sharing, the one or more processors are configured to:

stream a first copy of the first display content to the second endpoint device; and while streaming the first copy of the first display content to the second endpoint device, and while streaming the second display content for the video conference session to the third endpoint device while preventing the second display content for the video conference session from being streamed to the first endpoint device, stream a second copy of the first display content for the video conference session to the third endpoint device.

12. The apparatus of claim 11, wherein the one or more processors are configured to:

stream the second display content for the video conference session with at least a portion of the first copy of the first display content for the video conference session omitted from the second display content for the video conference session.

13. The apparatus of claim 11, wherein the one or more processors are configured to:

stream the first copy of the first display content for the video conference session for display on a first display screen associated with the second endpoint device;

stream the second copy of the first display content for the video conference session for display on a first display screen associated the third endpoint device; and stream the second display content for the video conference session for display on a second display screen associated with the third endpoint device, wherein the second display content for the video conference session is displayed on a second display screen associated with the second endpoint device.

14. The apparatus of claim 9, wherein the one or more processors are further configured to:

obtain, from the second endpoint device, mark-up content associated with the second display content for the video conference session; and provide the mark-up content to the third endpoint device while preventing the mark-up content from being provided to the first endpoint device.

15. The apparatus of claim 9, wherein the one or more processors are further configured to:

obtain audio for the video conference session from the third endpoint device or from an endpoint device associated with a third user of the third endpoint device;

provide the audio for the video conference session obtained from the third endpoint device or the audio from the endpoint device associated with the third user of the third endpoint device to the second endpoint device or an endpoint device associated with a second user of the second endpoint device; and prevent the audio for the video conference session obtained from the third endpoint device or the audio from the endpoint device associated with the third user of the third endpoint device from being provided to the first endpoint device or an endpoint device associated with a first user of the first endpoint device.

16. One or more non-transitory computer readable storage media encoded with instructions that, when executed by a processor, cause the processor to:

obtain first display content for a video conference session from a first endpoint device wherein the video conference session is one video conference session that includes the first endpoint device, a second endpoint device, and a third endpoint device;

stream the first display content for the video conference session to the second endpoint device;

obtain second display content for the video conference session from the second endpoint device;

determine an available network bandwidth for the video conference session;

determine whether to utilize cascaded content sharing or combinational content sharing for streaming the second display content for the video conference session to the third endpoint device based, at least in part, on the available network bandwidth for the video conference session; and while streaming the first display content for the video conference session to the second endpoint device, stream the second display content for the video conference session to the third endpoint device utilizing the cascaded content sharing or the combinational content sharing while preventing the second display content for the video conference session from being streamed to the first endpoint device, wherein streaming the second display content for the video conference session to the third endpoint device is capable of being switched between the cascaded content sharing and the combinational content sharing based, at least in part, on the available network bandwidth for the video conference session.

17. The one or more non-transitory computer readable storage media of claim 16, wherein for the cascaded content sharing, the second display content for the video conference session includes at least a portion of the first display content for the video conference session, and wherein the instructions further cause the processor to:

stream the at least the portion of the first display content for the video conference session to the third endpoint device.

18. The one or more non-transitory computer readable storage media of claim 16, wherein for the combinational content sharing, the instructions further cause the processor to:

stream a first copy of the first display content for the video conference session to the second endpoint device; and while streaming the first copy of the first display content for the video conference session to the second endpoint device, and while streaming the second display content for the video conference session to the third endpoint device while preventing the second display content for the video conference session from being streamed to the first endpoint device, stream a second copy of the first display content for the video conference session to the third endpoint device.

19. The method of claim 1, wherein presence of the third endpoint device in the video conference session is visible to the second endpoint device and the presence of the third endpoint device in the video conference session is not visible to the first endpoint device.

20. The one or more non-transitory computer readable storage media of claim 16, wherein the instructions further cause the processor to:

obtain, from the second endpoint device, mark-up content associated with the second display content for the video conference session; and provide the mark-up content to the third endpoint device while preventing the mark-up content from being provided to the first endpoint device.

* * * * *